United States Patent
Alam et al.

(10) Patent No.: US 11,833,677 B2
(45) Date of Patent: Dec. 5, 2023

(54) SEMI-AUTONOMOUS EXOSKELETON APPARATUS FOR SOLAR PANEL INSTALLATION

(71) Applicant: INVENTUS HOLDINGS, LLC, Juno Beach, FL (US)

(72) Inventors: Tanvir E. Alam, Palm Beach Gardens, FL (US); Jeffrey R. Burkett, Hobe Sound, FL (US)

(73) Assignee: Inventus Holdings LLC, Juno Beach, FL (US)

( * ) Notice: Subject to any disclaimer, the term of this patent is extended or adjusted under 35 U.S.C. 154(b) by 16 days.

(21) Appl. No.: 17/725,027

(22) Filed: Apr. 20, 2022

(65) Prior Publication Data

US 2023/0339096 A1 Oct. 26, 2023

(51) Int. Cl.
*B25J 9/00* (2006.01)
*B25J 15/06* (2006.01)
(Continued)

(52) U.S. Cl.
CPC .......... *B25J 9/0006* (2013.01); *B25J 15/0616* (2013.01); *H02S 99/00* (2013.01); *B25J 13/088* (2013.01)

(58) Field of Classification Search
CPC .... B25J 9/0006; B25J 15/0616; B25J 13/088; H02S 99/00
(Continued)

(56) References Cited

U.S. PATENT DOCUMENTS

| 8,413,944 B2 * | 4/2013 | Harberts | F24S 25/65 |
| | | | 248/500 |
| 8,657,991 B2 | 2/2014 | Potter et al. | |

(Continued)

FOREIGN PATENT DOCUMENTS

| CN | 110605355 | 9/2019 |
| WO | 2014108196 | 7/2014 |

(Continued)

OTHER PUBLICATIONS

MIT Technology Review These Robots Install Solar Panels Reducing labor costs could help make solar power more affordable. by Kevin Bullis Jul. 25, 2012 https://www.technologyreview.com/2012/07/25/184783/these-robots-installsolar-panels/.

(Continued)

*Primary Examiner* — David Luo
(74) *Attorney, Agent, or Firm* — Fleit Intellectual Property Law; Jeffrey N. Giunta

(57) ABSTRACT

An exoskeleton for installation of solar panels. The exoskeleton includes a central connection structure, at least one leg structure rotatably depending from the central connection structure. Each leg structure has a foot structure depending therefrom to contact a ground surface. At least one arm structure rotatably depends from the central connection structure. At least one solar panel holder depends from an arm structure and releasably holds a solar panel being supported by the arm structure. At least one limb actuator controllably provides forces to rotate the at least one leg structure and the at least one arm structure about the central connection structure to transfer forces from the respective arm supporting the solar panel to the ground surface through the at least one leg structure. A rotatably attached at least one auxiliary tool strut is movably positioned to operate beneath the solar panel as it is mounted onto a support.

16 Claims, 7 Drawing Sheets

(51) Int. Cl.
*H02S 99/00* (2014.01)
*B25J 13/08* (2006.01)

(58) Field of Classification Search
USPC ............ 318/568.12, 568.11, 568.1, 567, 560
See application file for complete search history.

(56) References Cited

U.S. PATENT DOCUMENTS

| | | |
|---|---|---|
| 9,457,463 B2 | 10/2016 | Tadayon |
| 9,494,341 B2 | 11/2016 | Trujillo et al. |
| 9,519,882 B2 | 12/2016 | Galluzzo et al. |
| 9,655,292 B2 | 5/2017 | Swahn et al. |
| 9,937,846 B2 | 4/2018 | French et al. |
| 10,232,505 B2 | 3/2019 | Tadayon |
| 10,439,550 B1 | 10/2019 | Goodman |
| 10,464,760 B2 | 11/2019 | Herfert |
| 10,926,401 B2 | 2/2021 | Tadayon |
| 11,014,131 B2 | 5/2021 | Wang et al. |
| 2009/0205703 A1 | 8/2009 | Umotoy et al. |
| 2012/0027550 A1 | 2/2012 | Bellacicco et al. |
| 2013/0048752 A1 | 2/2013 | Gilon et al. |
| 2019/0134822 A1 | 5/2019 | Clemenzi et al. |
| 2020/0024853 A1 | 1/2020 | Furrer et al. |
| 2020/0256051 A1 | 8/2020 | Becerril Hernndez |
| 2020/0350850 A1 | 11/2020 | Di Stefano et al. |
| 2020/0412295 A1 | 12/2020 | Miller et al. |
| 2021/0205997 A1 | 7/2021 | Zhou et al. |
| 2021/0211096 A1 | 7/2021 | Clemenzi et al. |

FOREIGN PATENT DOCUMENTS

| | | |
|---|---|---|
| WO | 2014159566 | 10/2014 |
| WO | 2015140363 | 9/2015 |
| WO | 2020088726 | 5/2020 |

OTHER PUBLICATIONS

Solar Builder Install-O-Matic: One solar company is turning the jobsite into a factory by Chris Crowell Feb. 8, 2016 https://solarbuildermag.com/news/automated-solar-installation-robotictechnology/.

* cited by examiner

SEMI-AUTONOMOUS EXOSKELETON APPARATUS FOR SOLAR PANEL INSTALLATION

FIELD OF THE DISCLOSURE

The present disclosure generally relates to equipment to assist a worker's installation of equipment, and more particularly to an exoskeleton apparatus that provides power assist to workers to handle, manipulate, and install physical equipment.

BACKGROUND

Installation of various types of physical equipment, such as solar panels and associated equipment when constructing a solar field, are tedious and time-consuming tasks that often require expending large amounts of physical efforts by the workers. Such construction activities often include repetitive and prolonged tasks throughout the work day. Accommodating workers in such environments often includes giving individual workers extended breaks from the strenuous activities and increasing the number of workers assigned to each task, which can reduce productivity and increase costs.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

Figure 1:
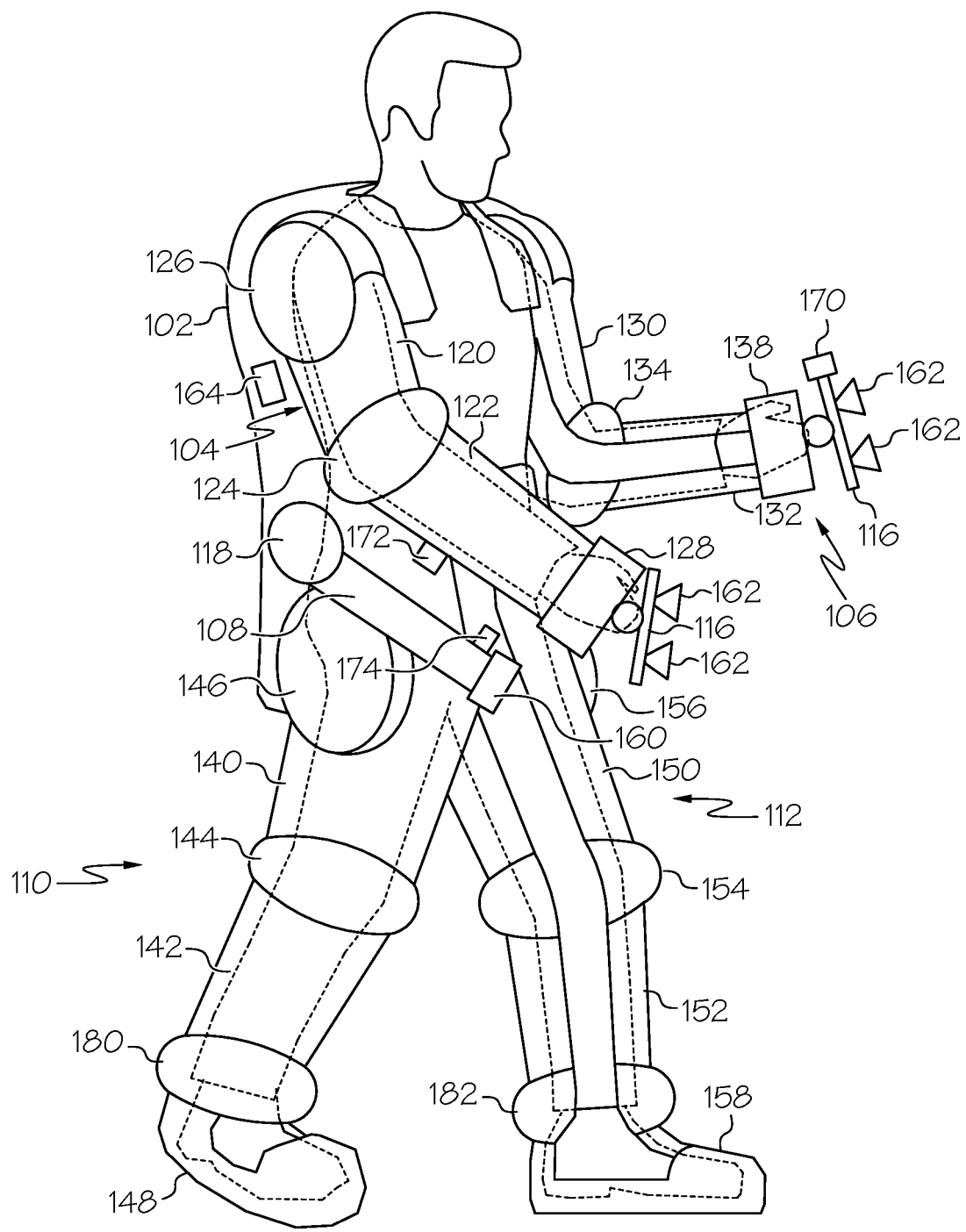
FIG. 1 depicts an overall view of an operator worn exoskeleton, according to an example.

FIG. 1 depicts an overall view of an operator worn exoskeleton 100, according to an example. The depicted operator worn exoskeleton 100 in this example is shown without an operator present and depicts various operational elements that are relevant to the present discussion. It is to be understood that exoskeletons that are consistent with the below description are able to include additional elements or elements similar to those described herein.

The operator worn exoskeleton 100 includes a torso section 102, a right operator arm receiver 104, a left operator arm receiver 106, a right leg receiver 110 and a left leg receiver 112. The right operator arm receiver 104, the left operator arm receiver 116, the right leg receiver 110 and the left leg receiver 112 are structural components of the operator worn exoskeleton 100. In some examples, the components of the operator worn exoskeleton 100 are configured to support the weight of objects attached to various components of the operator worn exoskeleton 100 and transfer the weight of those objects to the ground.

The operator worn exoskeleton 100 in an example is configured to allow a person to place her or her body into the operator worn exoskeleton 100 so as to facilitate its operation. As described in further detail below, the operator worn exoskeleton 100 in some examples includes articulated joints with powered actuators at those joints to facilitate supporting or moving, either totally or partially, objects attached to the operator worn exoskeleton 100. In some examples, components of the operator worn exoskeleton 100 have sensors or controls that sense movements or other actions by the person within the operator worn exoskeleton 100 and allow that person to control or direct the operation of the operator worn exoskeleton 100. In some examples, the operator worn exoskeleton 100 includes a controller 164 that supports either full or partial automation of tasks to be performed by the operator worn exoskeleton 100, such as the installation of solar panels onto mounting frames in a solar farm.

The torso section 102 is an example of a central connection structure and in an example is a rigid component onto which the right operator arm receiver 104, the left operator arm receiver 106, the right leg receiver 110 and left leg receiver 112 are attached. In some examples the right leg receiver 110 is attached to the torso section 102 by a powered right leg joint 146 that operates to position the right leg receiver 110 into a desired position and move the right leg receiver 110 as needed to perform various tasks. In some examples, the controller 164 controls the powered right leg joint 146 either according to an autonomous program being executed by the controller 164, in response to operator inputs provided by the person within the operator worn exoskeleton 100, or both. In the illustrated example, the left leg receiver 112 is attached to the torso section 110 via a left leg joint 156 that operates similarly to the right leg joint 144.

The right arm receiver 104 is connected to the torso section 102 by a powered right shoulder joint 126. The left arm receiver 106 is also connected to the torso section 102 by a powered left shoulder joint (not shown due to being obscured by the torso section 102). In various examples, the torso section 102, right arm receiver 104, powered right shoulder joint 126, powered left shoulder joint, the left arm receiver 106, the right leg receiver 110, the powered right leg joint 146, the left leg receiver 112 and the powered left leg joint 156 have suitable apertures, openings, other features, or combinations of these to allow a person to place his or her arms into those elements while appurtenant to the torso section 102. In an example, the torso section 102 is a rigid structure that allows the person to stand behind the torso section 102 as viewed from the illustrated perspective while the person's arms and legs are within their respective arm receiver and leg receiver. In further examples, torso sections are able to have any structure and have any position relative to a person wearing the operator worn exoskeleton 100. In some examples, the torso sections are able to be flexible, articulated, otherwise re-positional, or combinations of these. The torso section 102 in an example transfers forces from the right arm receiver 104, powered right shoulder joint 126, powered left shoulder joint and the left arm receiver 106 to the right leg receiver 110 and the left leg receiver 112.

The right arm receiver 104 includes powered right shoulder joint 126, a right operator upper arm receiver 120, a right elbow actuator 124, a right operator lower arm receiver 122, right hand receiver and grabber device actuator 128. These components operate similarly to a human arm and in an example form a structure that generally conforms to the shape of a human arm. The powered right shoulder joint 126 in an example supports rotational movements in directions that correspond to a human shoulder. The right elbow actuator 124 in an example also moves in the direction of a human elbow. The right hand receiver and grabber device actuator 128 in various examples is able to articulate at various angles similar to the movements of a human wrist. The right hand receiver and grabber device actuator 128 in an example has a right solar panel "grabber device" 114 attached thereto. The right solar panel "grabber device" 114 in the illustrated example has a number of suction cup panel grabbers 162 attached thereto. The right arm receiver 104 also has an arm mounted camera 172 that is able to capture images at the end of the right solar panel grabber device 114 to support automated operations. In various examples, the arm mounted camera 172 is able to capture images over a wide view angle to monitor various areas around the operator worn exoskeleton 100. The arm mounted camera 172, along with any other camera or optical sensor mounted to or associated with the operator worn exoskeleton 100, is able to be any suitable optical sensor that is able to detect images in one or more spectral ranges, such as infrared spectral images, is able to be LiDAR device, other type of sensor, or combinations of these.

The components of the right arm receiver 104 in various examples have openings, apertures, other features, or combinations of these, to allow a person in the operator worn exoskeleton 100 to place their arm into or remove their arm from the right arm receiver 104. In various examples, the components of the right arm receiver 104 have sensors to detect movements or pressures exerted by the arm of the person who is in the operator worn exoskeleton 100. The right hand receiver and grabber device actuator 128 in some examples also has controls that are able to be operated by a hand of a person who is in the operator worn exoskeleton 100 and used to select or control various operations to be performed by the operator worn exoskeleton 110.

The number of suction cup panel grabbers 162 that are attached to the right solar panel "grabber device" 114 in the illustrated example are suction devices that are configured to be placed on a solar panel (not shown) to removably attach to the solar panel. In an example, the right arm receiver 104 articulates, under autonomous programming control by the controller 164, under control specified by a person who is in the operator worn exoskeleton 100, or a combination of both, to properly position the right solar panel grabber device 114 to cause the suction cup panel grabbers 162 to be placed flatly on the solar panel to allow suction to be applied and to thereby secure the solar panel to the right solar panel grabber device 114. In some examples, the suction cup grabbers 162 are configured to operate to first blow a blast of air to clean dirt and debris from the area of the solar panel to be engaged by the suction cups prior to applying suction to the suction cups to attach to the solar panel. Once the right solar panel grabber device 114 is secured to the solar panel, the actuators on the right arm receiver 104 are able to lift and position the solar panel into various positions. In an example, the operator worn exoskeleton 100 is able to operate autonomously, semi-autonomously, or under partial or total manual control, to identify a solar panel awaiting installation, locate the right arm receiver 104 to position its suction cup grabbers 162 to engage the surface of the solar panel awaiting installation, activate suction on the suction cup grabbers 162 to engage the solar panel awaiting installation, activate the actuators, such as the right elbow actuator 124, right shoulder actuator 126, and the right hand receiver and grabber device actuator 128, to pick up the solar panel and maneuver it into position for installation. In some examples, images captured by the right camera 176 are used to monitor the position of solar panels attached to the right solar panel grabber device 114 and neighboring elements such as frames onto which that panel is to be mounted in order to coordinate the automated installation of the solar panel onto the frame.

The left arm receiver 106 has components that correspond to the above described components of the right arm receiver 104. In the illustrated example, the left arm receiver 106 includes a powered left shoulder joint (not shown but is behind the torso section 102), a left operator upper arm receiver 130, a left elbow actuator 134, a left operator lower arm receiver 132, a left hand receiver and grabber device actuator 138, and a left solar panel grabber device 116 that has a number of suction cup panel grabbers 162. These components operate similarly to the components of the above described right arm receiver 104. The left arm receiver 106 is able to operate as described above with respect to the right arm receiver 104 to attach to and lift a solar panel for placement into an installation location such as a frame. In an example the right arm receiver 104 and the left arm receiver 106 operate in concert to both attach to a solar panel to be installed into a frame. By these two arm receivers operating in concert, the operator worn exoskeleton 100 is able to have better control over the movement and positioning of the solar panel with lower forces on actuators relative to a single arm supporting and manipulating the solar panel.

The illustrated left solar panel grabber device 116 has a grabber device camera 170 mounted thereto. The grabber device camera 170 in various examples, as with the right cameral 172 discussed above, is able to be any suitable optical sensor that is able to detect images in one or more spectral ranges, such as infrared, is able to be LiDAR device, other type of sensor, or combinations of these. The grabber device camera 170 is able to capture images over a wide view angle to monitor various areas around the operator worn exoskeleton 100. In general, further examples of the operator worn exoskeleton 100 are able to have no cameras or any number of cameras mounted at any location of the operator worn exoskeleton 100. In some examples, one or more cameras that are attached to components of the operator worn exoskeleton 100 are able to capture images relevant to installation of equipment being performed by the operator worn exoskeleton 100. For example, one or more cameras are able to capture images of the solar panel being held by the right solar panel grabber device 114 and the left solar panel grabber device 116 and also images of the installation location for that solar panel. Processing of such images are able to, for example, direct the movement of the right arm receiver 104 and left arm receiver 106 when holding a solar panel for installation and guiding the movement of the solar panel to the proper location on a frame for mounting. In an example, processing of such images is able to identify the location of already installed neighboring solar panels and determine relative placement of a solar panel next to those neighboring solar panels to, e.g., ensure proper alignment of and separation between installed solar panels. In some examples, one or more such camera is able to capture optical data in the infra-red spectrum. Infra-red images of an installed solar panel are able to be processed to determine if the installed solar panel has developed a micro crack during handling.

In an example, the controller 164 is able to automatically coordinate the movements of the components of both the left arm receiver 106 and the right arm receiver 104 to facilitate the coordinated operations of the left arm receiver 106 and right arm receiver 104 to both attach to and lift a single solar panel and move that solar panel into place for installation into an installation location such as a frame. Such coordinated operations include, but are not limited to, holding the solar panel in the correct orientation and position for placement onto the frame, causing the operator worn exoskeleton to move, similar to walking, to a determined position such as near a solar panel to be installed or a frame onto which an attached solar panel is to be installed, positioning the solar panel at the correct location on the frame for installation, other movements or positioning operations, or combinations of these.

The lower tool arm 108 is an example of an auxiliary tool strut and in an example is attached to the torso section 102 by a powered lower arm joint 118. The lower tool arm 108 in an example is able to be moved to a location in front of the torso section 102 either under autonomous control of the controller 164, under control of the person within the operator worn exoskeleton 100, or both. The lower tool arm 108 in an example is able to manipulate tools, fasteners, other hardware, or combinations of these, at a location beneath or above a solar panel that has been positioned for installation by the left arm receiver 106 and right arm receiver 104 as discussed above. In some examples, the lower tool arm 108 is able to use different tools that are able to be affixed at various points of the lower tool arm 108, such as at the distal end where tool 160 is shown. In some examples, the lower tool arm 108 is able to be designed to lift heavy equipment and be supported by the torso 102 and legs 110, 112.

The ability of the operator worn exoskeleton 100 to utilize a third arm, such as the lower tool arm 108, to manipulate installation equipment at locations either above or below a solar panel being installed into a frame while two other arms, the left arm receiver 106 and right arm receiver 104, are holding, manipulating and positioning the solar panel for installation. In some examples, the lower tool arm 108 has a tool arm camera 174 to capture images of the tool 160 and its operation on components being installed such as on the bottom side of a frame and solar panel solar panel being held in position by the left arm receiver 106 and right arm receiver 104.

The right leg receiver 110 is connected to the torso section 102. In the illustrated example, the right upper leg receiver 140 is connected to the torso section 102 by a powered right upper leg joint 146. The right lower leg receiver 142 is connected to the right upper leg receiver 140 by a right knee actuator 144. The right lower leg receiver 142 is connected to a right foot base 148 by a right ankle actuator 180.

The left leg receiver 112 is connected to the torso section 102 and consists of a number of components that are similar to, and interconnected in similar manners, as the above described right leg receiver 110. In the illustrated example, the left upper leg receiver 150 is connected to the torso section 102 by a powered left upper leg joint 156. The left lower leg receiver 152 is connected to the left upper leg receiver 150 by a left knee actuator 154. The left lower leg receiver 152 is connected to a left foot base 158 by a left ankle actuator 182.

In various examples, the components of the right leg receiver 110 and the left leg receiver 112 allow a person within the operator worn exoskeleton 100 to place his or her legs adjacent to or into the respective right leg receiver 110 and left leg receiver 112 in order to facilitate operation of the operator worn exoskeleton 100. In various examples, sensors are place at various locations with the right leg receiver 110 and left leg receiver 112 to sense movements of the person's legs and adjust operation of the operator worn exoskeleton 100, such as by controlling movement of the right leg receiver 110 or the left leg receiver 112, in response to sensed movements or forces exerted by the legs of the person wearing the operator worn exoskeleton 100.

The powered right upper leg joint 146 allows movement of the right upper leg receiver 140 in the range of motions of a human hip when a person is inside the operator worn exoskeleton 100. The right knee actuator 144 provides the range of movement between the right upper leg receiver 140 and the right lower leg receiver 142 that corresponds to a human knee when a person is inside the operator worn exoskeleton 100. The right ankle actuator 180 couples the right lower leg receiver 142 to the right foot base 148 with a range of movement that corresponds to the movement of a human ankle when a person is inside the operator worn exoskeleton 100. The powered left leg joint 156, left knee actuator 154, and left ankle actuator 182 provide similar ranges of movement as the corresponding actuators and joints of the right leg receiver 110. In an example, all of these joints and actuators include motors or other actuators that support the weight of the operator worn exoskeleton 100 along with solar panels held by the right solar panel grabber device 114 and the left solar panel grabber device 116, tools, other objects, or combination of these, in order to transfer the forces caused by the weight of those objects to the right foot base 148 and left foot base 158 and thus to the ground without requiring effort or forces to be applied by the person within the operator worn exoskeleton 100 to support those weights.

In the above description of the operator worn exoskeleton, the right elbow actuator 124, right shoulder actuator 126, right hand receiver and grabber device actuator 128, left elbow actuator 134, left shoulder actuator, and the left hand receiver and grabber device actuator 138, the right leg joint 146, right knee actuator 144, right ankle actuator 180, the powered left leg joint 156, left knee actuator 154, and left ankle actuator 182 are examples of limb actuators that are under the control of controller 164. The right leg receiver 110 and the left leg receiver 112 are examples of leg structures and the right arm receiver 104 and the left arm receiver 106 are examples of arm structures.

In some examples, some components of the operator worn exoskeleton 100 include coolers, heaters, other devices, or combinations of these (not shown), that provide cooling or heating to increase the comfort of the person wearing the operator worn exoskeleton 100. Such devices are able to include, for example, air ducts and vents throughout the operator worn exoskeleton 100 to distribute conditioned air, either heated or cooled according to ambient conditions, to various locations adjacent to the person wearing the operator worn exoskeleton. Such conditioned air is able to be obtained from any suitable source, such as via a hose connected to an apparatus located near the location where the operator worn exoskeleton 100 is being used, an apparatus attached to the operator worn exoskeleton 100, other arrangements, or combinations of these.

Figure 2:
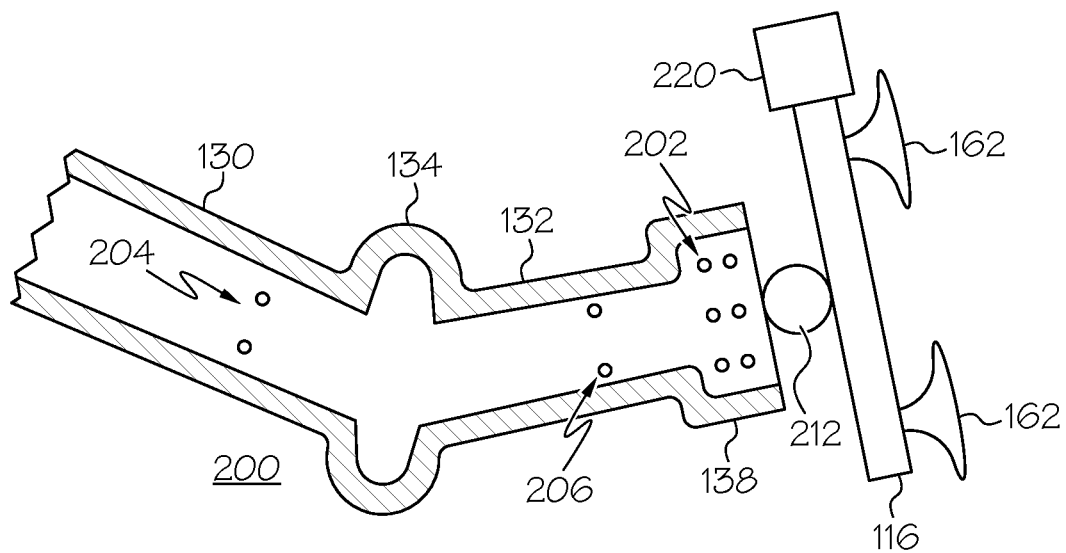
FIG. 2 illustrates a left arm detail, according to an example.

FIG. 2 illustrates a left arm detail 200, according to an example. The left arm receiver detail 200 shows an example of a portion of the above described left arm receiver 106. The description of the left arm detail 200 refers to the above description of the operator worn exoskeleton 100. The right arm receiver 104 in an example has features similar to the details described below for the left arm detail 200.

The left arm receiver detail 200 depicts an upper left arm receiver 130 and a lower left arm receiver 134 that are connected by a left elbow actuator 134. A left hand receiver and grabber device actuator 138 is shown to be attached to a distal end of the lower left arm receiver 132. As shown, the upper left arm receiver 130, the left elbow actuator 134, the lower left arm receiver 134, and the left hand receiver and grabber device actuator 138 have a continuous arm opening 210 that allows a person within the operator worn exoskeleton 100 to place his or her left arm into the left arm receiver 106.

The upper left arm receiver 130 has upper left arm sensors 204 to detect the presences of, the movement of, or both, of the person's upper arm when it is within the upper left arm receiver 130. The lower left arm receiver 132 has lower left arm sensors 206 to detect the presence of, movement of, or both, of the person's lower arm when it is within the lower left arm receiver 132. The left hand receiver and grabber device actuator 138 has hand control sensors 202 that allow the person whose arm is within the left arm receiver 106 to provide control inputs by activating the hand control sensors 202. In some examples, the upper left arm sensors 204, lower left arm sensors 206 and hand control sensors 202 are connected the controller 164 to provide controls to direct semiautonomous operation of the operator worn exoskeleton 100, provide controls for fully manual control of the operation of the operator worn exoskeleton 100, detect when an arm is removed from the left arm receiver 106 and halt operations or implement other safety protocols, to perform other operations, or combinations of these.

The left arm receiver detail 200 further shows a left solar panel grabber device 116 attached to the distal end of the left hand receiver and grabber device actuator 138. The left solar panel grabber device 116 is attached to the left hand receiver and grabber device actuator 138 by a gimbal 212 to allow for rotational movement of the left solar panel grabber device 116. The left solar panel grabber device 116 has a number of suction cups 162 on its end to engage with and attach to solar panels to be installed. The left solar panel grabber device 116 in the illustrated example has a solar panel camera 220 to capture images of the volume in front of the left solar panel grabber device 116 to assist in movement of the left arm receiver 106, the left solar panel grabber device 116, and other elements of the operator worn exoskeleton 100 to approach and properly place the left solar panel grabber device 116 to engage the solar panel to be installed at the proper location.

Figure 3:
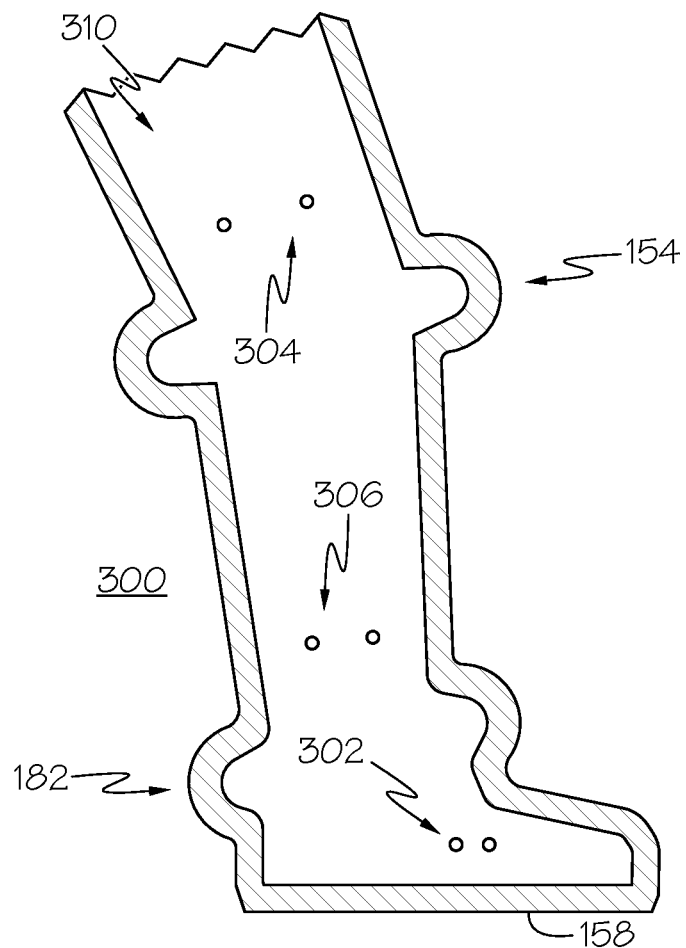
FIG. 3 illustrates a left leg receiver detail, according to an example.

FIG. 3 illustrates a left leg receiver detail 300, according to an example. The left leg receiver detail 300 shows an example of a portion of the above described left leg receiver 112. The description of the left leg receiver detail 300 refers to the above description of the operator worn exoskeleton 100. The right leg receiver 110 in an example has features similar to the details described below for the left leg receiver detail 300.

The left leg receiver detail 300 depicts an upper left leg receiver 150 and a lower left leg receiver 152 that are connected by a left knee actuator 154. A left foot base 158 is shown to be attached to a distal end of the lower left leg receiver 152. As shown, the upper left leg receiver 150, the left knee actuator 154, the lower left leg receiver 154, the left ankle actuator 182 and the left foot base 158 have a continuous leg opening 310 that allows a person within the operator worn exoskeleton 100 to place his or her left leg and foot into the left leg receiver 112.

The upper left leg receiver 150 has upper left leg sensors 304 to detect the presences of, the movement of, or both, of the person's upper leg when it is within the upper left leg receiver 150. The lower left leg receiver 152 has lower left leg sensors 306 to detect the presence of, movement of, or both, of the person's lower leg when it is within the lower left leg receiver 132. The left foot base 158 has foot sensors 302 that detect movement of or sense the presence of a foot in the left foot base 158. In some examples, the upper left leg sensors 304, lower left leg sensors 306 and foot sensors 302 are connected the controller 164 to provide controls to direct semiautonomous operation of the operator worn exoskeleton 100, provide controls for fully manual control of the operation of the operator worn exoskeleton 100, detect when a leg or foot is removed from the left leg receiver 106 and halt operations or implement other safety protocols, to perform other operations, or combinations of these.

The upper left arm sensors 204, lower left arm sensors 206 and hand control sensors 202, upper leg sensors 304, lower leg sensors 306 and foot sensors 302 are all examples of motion control inputs that are disposed within the operator worn exoskeleton 100 and allow the person standing within the operator worn exoskeleton 100 to provide control of the at least one limb actuator to direct movement of at least one of the at least one leg structure, the at least one arm structure, and the at least one solar panel holder. In some examples, these motion control inputs include pressure sensors mounted in at least one of the at least one arm structure or the at least one leg structure, the pressure sensors to determine forces applied by the person's limbs and sending indications of the forces to the controller, and where the controller directs movement of the at least one leg structure, the at least one arm structure, or the at least one solar panel holder based on the indication of the forces.

Figure 4:
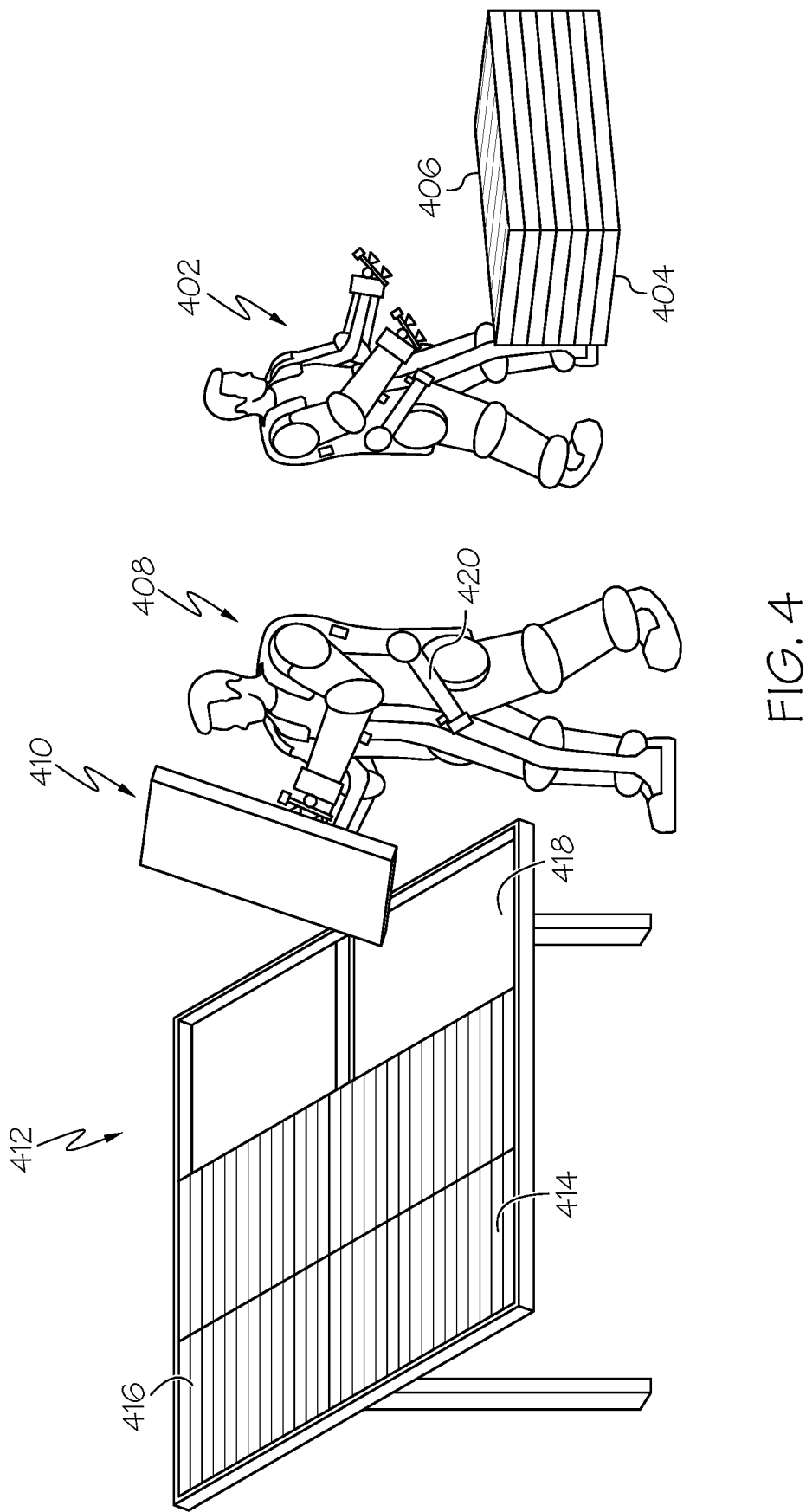
FIG. 4 illustrates a solar panel installation, according to an example.

FIG. 4 illustrates a solar panel installation 400, according to an example. The solar panel installation 400 depicts two operator worn exoskeleton, a first operator worn exoskeleton 402 and a second operator worn exoskeleton 406. A person is within each of these operator worn exoskeletons, which are similar to the operator worn exoskeleton 100 discussed above, and is able to control the operation of his or her operator worn exoskeleton 100. The person within each of the operator worn exoskeletons 100 is able to manually control the operation of the operator worn exoskeleton 100, control semiautonomous operation of the operator worn exoskeleton 100, or combinations of these.

The first operator worn exoskeleton 402 is standing at a solar panel pallet 404 and its arms are positioned to engage the top solar panel 406 on the solar panel pallet 404. The first operator worn exoskeleton 402 has suction cup based solar panel grabber devices as are described above with regards to the operator worn exoskeleton 100.

A held solar panel 410 is being held by the illustrated second operator worn exoskeleton 408 into a position in preparation for installation into a frame 412. The illustrated frame 412 has four locations into which solar panels can be mounted. A first mounted solar panel 414 and a second mounted solar panel 416 are shown to be already mounted on the frame 412. In the illustrated example, the installation plan calls for the held solar panel 410 to be installed in the lower right portion 418 of the frame 412. In an example, cameras mounted on the second operator worn exoskeleton 408, such as the above described grabber device camera 170, right camera 172, and the tool arm camera 174, are able to capture images of the frame 412, identify the locations of already installed neighboring solar panels such as the first mounted solar panel 414 and the second mounted solar panel 416, and track the movement of the held solar panel 410 relative to the already installed neighboring solar panels as it is installed to ensure the proper placement of the held solar panel 410 into the lower right portion 418. Once the held solar panel 410 is properly places into the lower right portion 418, the cameras on the second operator worn exoskeleton are able to capture images of the neighboring solar panels and the held solar panel 410 to ensure proper separation between the installed panels. The tool arm 420 of the second operator worn exoskeleton 408 is then able to install fasteners onto the bottom of the mounting position on the frame 412 and the bottom of the held solar panel 410 once it is properly placed.

Figure 5:
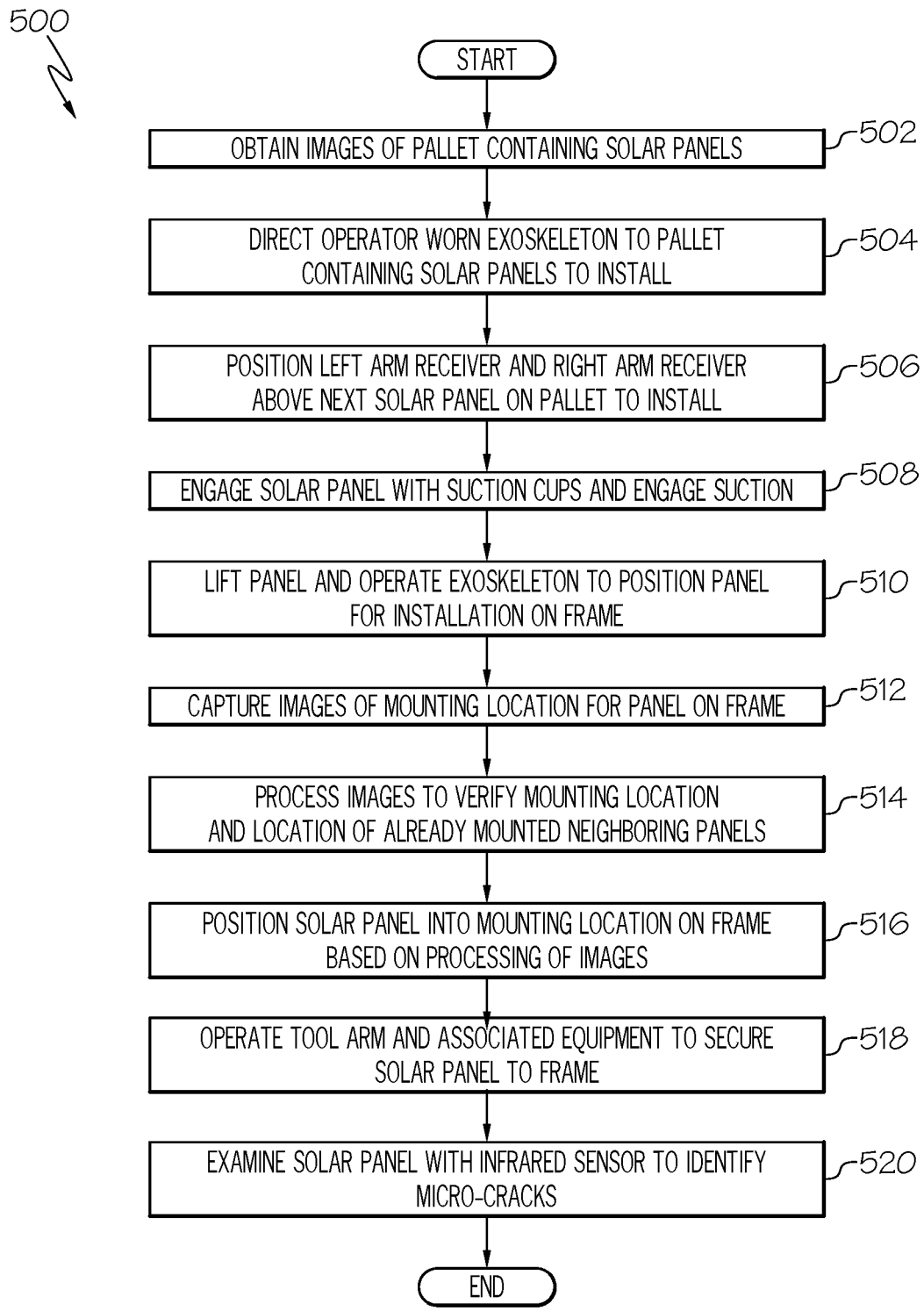
FIG. 5 illustrates an autonomous operator worn exoskeleton solar panel installation process, according to an example

FIG. 5 illustrates an autonomous operator worn exoskeleton solar panel installation process 500, according to an example. The autonomous operator worn exoskeleton solar panel installation process 500 in an example of an automated solar panel installation process that is controlled by processing performed by the above-described controller 164 of the operator worn exoskeleton 100. In some examples, a semiautonomous installation process is able to be performed by the controller 164 performing some of the below operations while an operator, either within the operator worn exoskeleton 100 or an operator remote therefrom, performs other operations to implement the installation procedure. In various examples, operator inputs, such as those provided via the above-described sensors in the operator worn exoskeleton 100, are able to affect the below described operations by providing direction, control, modifications, overrides, other influences, or combinations of these, to the below described operations.

The autonomous operator worn exoskeleton solar panel installation process 500 obtains, at 502, one or more images of pallet containing solar panels. Such a pallet is pallet 404 described above with regards to solar panel installation 400. In various examples, one or more images of the pallet are able to be obtained by any suitable camera, such as cameras or optical sensors mounted on the operator worn exoskeleton or nearby the pallet.

The operator worn exoskeleton is directed, at 504, to the pallet containing solar panels to install. Such direction is able to be based on the images captured above, at 502, based on other images or location information, or combinations of these. In an example, the operator worn exoskeleton is directed by the controller 164 controlling actuators in the right leg receiver 110 and the left leg receiver 112 to move those components in a manner that "walks" the operator worn exoskeleton from its present location to a location near the pallet.

The left arm receiver and the right arm receiver are positioned, at 506, above next solar panel on pallet to install. Such positioning is able to be performed based on images captured by cameras or other sensors mounted on the exoskeleton or that are nearby the pallet, based on other images or location information, or combinations of these. In an example, the operator worn exoskeleton is directed by the controller 164 controlling actuators in the right arm receiver 104, along with the right solar panel grabber device 114 and the left arm receiver 106 along with the left solar panel grabber device 116 to move those components in a manner that positions the right solar panel grabber device 114 and the left solar panel grabber device 116 at proper positions above the next solar panel for engagement by the suction cups of the right solar panel grabber device 114 and left solar panel grabber device 116.

The solar panel to be installed is attached with suction cups and suction is engaged, at 508. In some examples, the area of solar panel under suction cups is cleaned prior to engaging suction. In an example, once these suction cups, such as the suction cups 162 discussed above, are located in the proper position above the solar panel to engage and attach to the solar panel, the controller 164 causes air to blow out of the suction cup to clean dirt and other debris from the area to be engaged by the suction cups. The controller in an example operates a suction pump to cause the suction cups at the distal ends of the right arm receiver 104 and the left arm receiver 106 to engage and attach to the solar panel.

The exoskeleton is operated, at 510, to lift and position the solar panel for installation on frame. In an example, the controller 164 controls actuators in the right arm receiver 104, along with the right solar panel grabber device 114 and the left arm receiver 106 along with the left solar panel grabber device 116 to move those components in a manner that lifts the solar panel attached thereto off of the pallet and into a position adjacent to the frame on which the solar panel is to be installed. This operation further can involve the controller 164 controlling actuators in the right leg receiver 110 and the left leg receiver 112 to move those components in a manner that "walks" the operator worn exoskeleton from its present location to a location near the location onto which the solar panel is to be installed on the frame.

An image of mounting location for panel on frame is captured, at 512. In various examples, one or more images of the pallet are able to be obtained by any suitable camera, such as cameras or optical sensors mounted on the operator worn exoskeleton or nearby the frame.

The images captured of the mounting location are processed, at 514, to verify mounting location and location of already mounted neighboring panels. In some examples, solar panels are specified to be installed with required separations from neighboring solar panels. Capturing images at the time of installation and processing them to determine the proper mounting location for a solar panel to be installed allows accommodation of misplacements or shifting of the neighboring solar panels by the automated installation process.

The solar panel is positioned, at 516, into mounting location on frame based on processing of images. In an example, the controller 164 controls actuators in the right arm receiver 104, along with the right solar panel grabber device 114 and the left arm receiver 106 along with the left solar panel grabber device 116 to move those components in a manner that positions the solar panel attached thereto into the proper mounting position on the frame as confirmed by processing of images of the frame, neighboring solar panels, and the solar panel being installed.

The tool arm and associated equipment is operated, at 518, to secure the solar panel to frame. In an example, the tool arm is able to position tools, hardware, other components, or combinations of these, at specified locations to properly secure the solar panel to the frame. In an example, mounting hardware is installed underneath the frame and solar panel while the right arm receiver 104, along with the right solar panel grabber device 114 and the left arm receiver 106 along with the left solar panel grabber device 116 hold the solar panel into position on the frame.

The solar panel is examined, at 520, with an infrared sensor or camera to detect micro-cracks. In an example the infrared sensor or camera is mounted on a component of the operator worn exoskeleton and allows inspection of the solar panel after all installation procedures are performed to increase the likelihood of detecting microcracks that developed during handling and installation of the solar panel.

Figure 6:
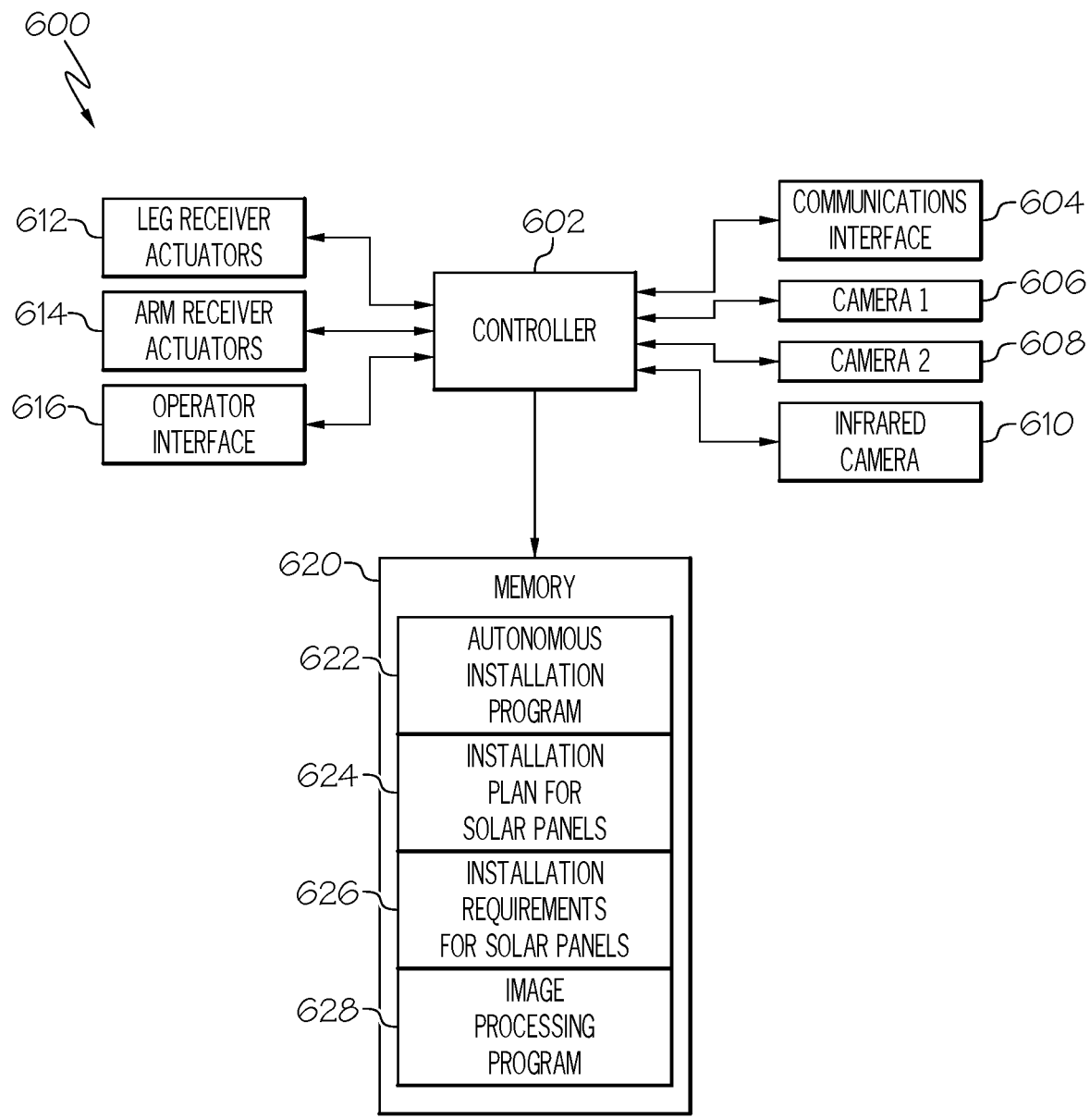
FIG. 6 illustrates a control system diagram, according to an example.

FIG. 6 illustrates a control system diagram 600, according to an example. With reference to the above described operator worn exoskeleton 100, the control system diagram 600 depicts a controller 602, which is an example of the controller 164 discussed above, and other elements with which it is in communication.

The controller 602 is shown to have a communications interface 604 that supports communications with remote devices. In various examples, the communications interface 604 is able to support communications between the controller, other devices associated with or connected to the operator worn exoskeleton 100, other devices, or combinations of these, and remote devices. Examples of data communicated over the communications link include, but are not limited to, programming for the controller 602, observations made by sensors on the operator worn exoskeleton 100, information to be presented to the operator of the operator worn exoskeleton 100, other information, or combinations of these.

The controller 602 is in communications with a camera 1 606, camera 2 608, and an infrared camera 610. The grabber camera 170 discussed above is an example of camera 1 606, the right camera 172 is an example of camera 2 608. In some examples, one of the grabber camera 170, the right camera 172, or both, also capture images in the infrared spectrum and are examples of infrared camera 610. In an example, the controller 602 controls the operation of these cameras and receives images from the cameras.

The controller 602 further controls leg receiver actuators 612 and arm receiver actuators 604. Examples of leg receiver actuators 612 include the right leg joint 146, right knee actuator 144, right ankle actuator 180, the left leg joint 156, left knee actuator 154, and the left ankle actuator 182. Examples of arm receiver actuators include the above described right elbow actuator 124, right shoulder actuator 126, right hand receiver and grabber device actuator 128 the left elbow actuator 134, left shoulder actuator 136, and the left hand receiver and grabber device actuator 138. In various examples, an operator worn exoskeleton is able to have any number of leg receiver actuators 612, arm receiver actuators 604, or combinations of these. In some examples, operator worn exoskeletons are able to not have one or more leg receiver actuators 612, or arm receiver actuators 614, that are under the control of a controller 602. In some examples, such actuators are under the manual control of the person within the operator worn exoskeleton 100.

The controller 602 in some examples communicates with an operator user interface 616. The operator interface 616 is able to provide instructions or other information to the operator in any suitable form, such as audio, visual, other forms, or combinations of these.

The controller 602 is in communication with a memory 620. The memory 620 in an example is able to store data that is accessed by the controller 602, processed by the controller 602, initially provided to and stored by the controller 602, other data, or combinations of these.

The illustrated memory 620 stores an autonomous installation program 622. The autonomous installation program 622 in an example is executed by the controller 602 to operate connected components of an operator worn exoskeleton to implement a defined installation procedure for solar panels. In some examples, the autonomous installation program 622 may allow operator intervention or control to implement semi-autonomous installation of solar panels under operator control. The autonomous installation program 622 is also able to be configured to adjust execution of itself in response to operator inputs, as is described above, to alter operations, halt, otherwise modify, or combinations of these.

The illustrated memory 620 stores installation plans for solar panels 624. The installation plans for solar panels 624 in various examples is able to define the installation process and steps to take such as when installing a number of solar panels in a solar farm. In some examples, the installation plans for solar panels 624 define the locations of positions on frames on which solar panels are to be installed and the autonomous installation program 622 uses this data to determine where to install solar panels.

The illustrated memory 620 stores installation requirements 626 for solar panels. In some examples, particular solar panels have installation requirements such as spacing from neighboring solar panels when they are installed onto frames, fastening requirements to secure the solar panels onto the frames, other requirements, or combinations of these. In some examples, the controller 602 accesses these installation requirements 626 as part of the autonomous installation program to determine actions to take in installing the solar panels.

The illustrated memory 620 stores an image processing program 628. The image processing program 628 directs the controller 602 to perform image recognition and other image processing of images, such as images received from camera 1 606, camera 2 608, infrared camera 610, other sources, or combinations of these. The information to be produced by this image processing program 628 in an example includes identification of and location determining of solar panels to be picked up, such as those on a pallet, identification of and location determining of locations on a frame at which solar panels are to be installed, determining the position and orientation of the solar panel being held by the operator worn exoskeleton 100 and its position and orientation relative the already installed solar panels neighboring the location into which the presently held solar panel is to be installed. The autonomous installation program 622 receives the output of such image processing to better direct installation of the solar panels. In some examples, processing of images may be split between the controller 602 and remote processors where some information is communicated to the remote processors by the communications interface 604.

Figure 7:
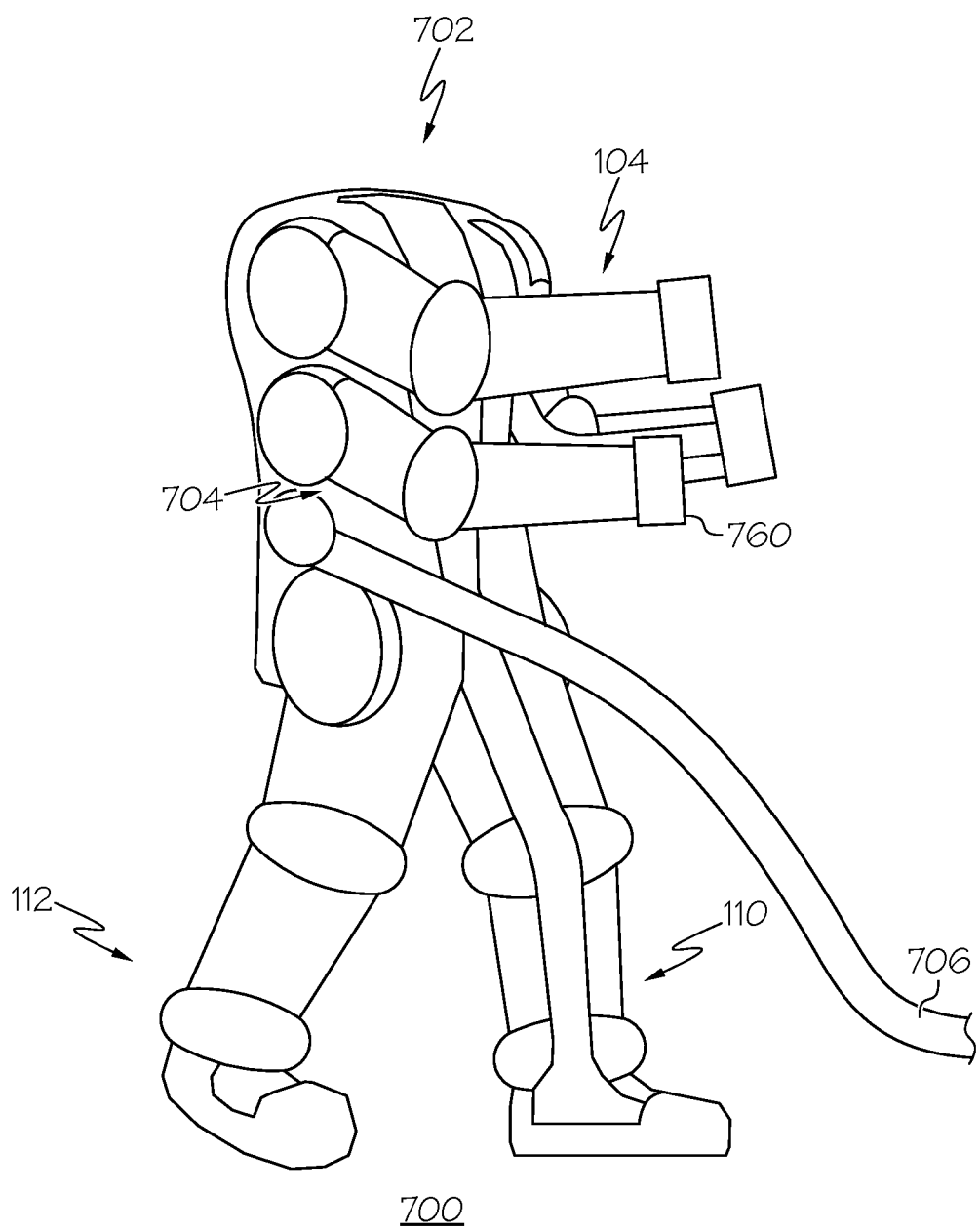
FIG. 7 illustrates a higher third arm operator worn exoskeleton, according to an example.

FIG. 7 illustrates a higher third arm operator worn exoskeleton 700, according to an example. The higher third arm operator worn exoskeleton 700 is similar to the above-described operator worn exoskeleton 100 but has a third arm receiver 704, which is an alternative example of an auxiliary tool strut, attached to an alternative torso section 702 at a location that is closer to but beneath the right arm receiver 104. In some examples, the person wearing the higher third arm operator worn exoskeleton 700 is able to remove his or her right arm from the right arm receiver 104 and place that arm in the third arm receiver 704. Such a design allows, in an example, the person wearing the higher third arm operator worn exoskeleton 700 to easily manipulate, for example, objects below a solar panel being installed while the right arm receiver 104 is used to hold or otherwise manipulate objects above that solar panel or on other structures. In various examples, an alternative third arm receiver (not shown), similar to the illustrated third arm receiver 704, is able to be mounted on the left side of the higher third arm operator worn exoskeleton 700, either as an alternative to, or in addition to, the illustrated mounting on the right side of the higher third arm exoskeleton 700. In some examples, the third arm receiver 704 is able to interchangeably use different tools that are able to be affixed at various points of the third arm receiver 704, such as at the distal end where tool 760 is shown. In some examples, the third arm receiver 704 is able to be designed to lift heavy equipment by transferring forces from the third arm receiver 704 to the alternative torso section 702 and the right leg receiver 110 and the left leg receiver 112.

The higher third arm operator worn exoskeleton 700 further has a conditioned air hose 706. The conditioned air hose 706 receives conditioned air, which is able to be heated or cooled depending on ambient conditions, in order to cool the operator wearing the higher third arm operator worn exoskeleton 700. The conditioned air received through the conditioned air hose 706 in an example is routed through ducts within the higher third arm operator worn exoskeleton 700, including through the leg and arm receivers.

Figure 8:
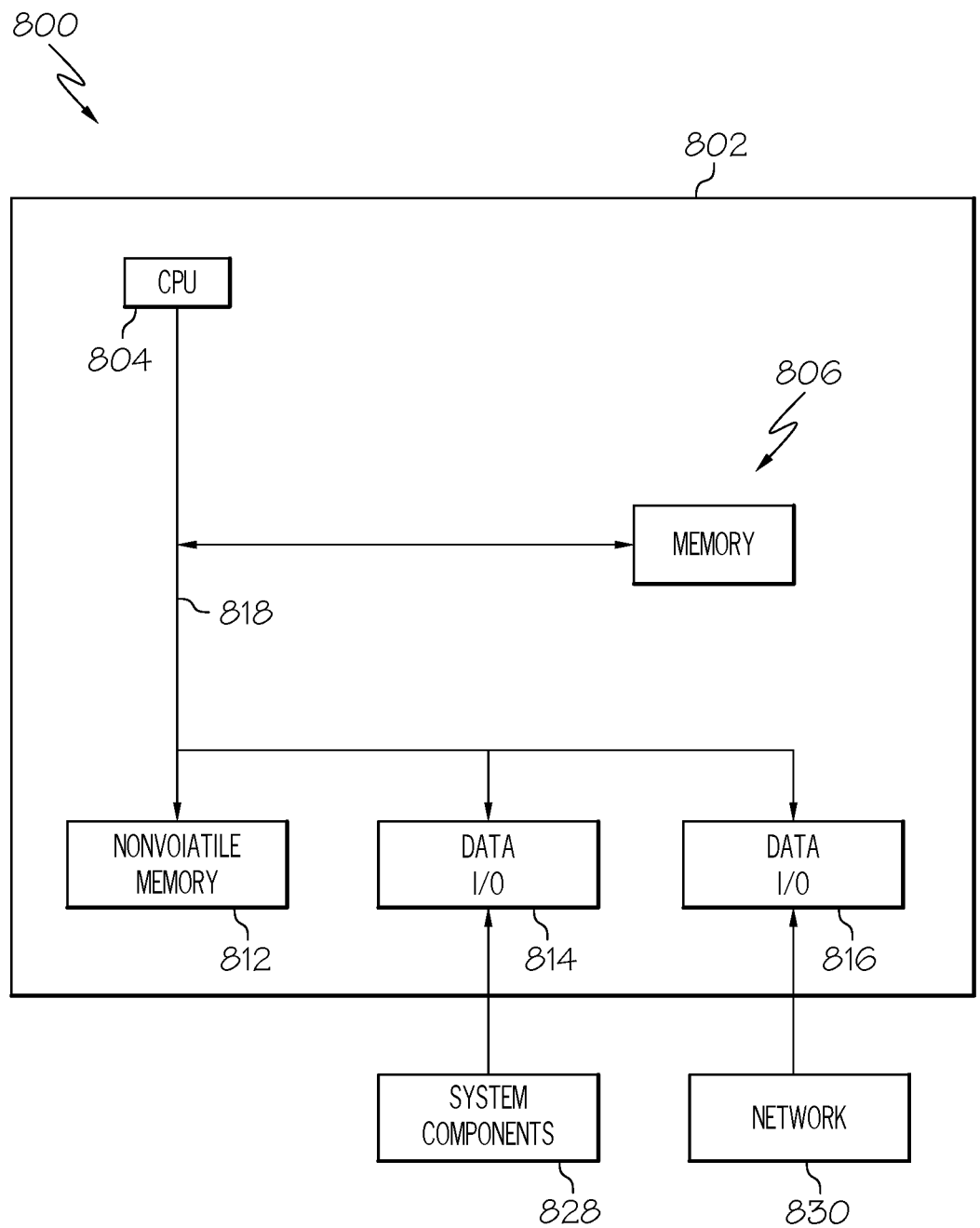
FIG. 8 illustrates a block diagram illustrating a processor according to an example.

FIG. 8 illustrates a block diagram illustrating a processor 800 according to an example. The processor 800 is an example of a processing subsystem, such as controller 164, that is able to perform any of the above-described processing operations, control operations, other operations, or combinations of these.

The processor 800 in this example includes a CPU 804 that is communicatively connected to a main memory 806 (e.g., volatile memory), a non-volatile memory 812 to support processing operations. The CPU is further communicatively coupled to a network adapter hardware 816 to support input and output communications with external computing systems such as through the illustrated network 830.

The processor 800 further includes a data input/output (I/O) processor 814 that is able to be adapted to communicate with any type of equipment, such as the illustrated system components 828. The data input/output (I/O) processor in various examples is able to be configured to support any type of data communications connections including present day analog and/or digital techniques or via a future communications mechanism. A system bus 818 interconnects these system components.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information. In general, the computer readable medium embodies a computer program product as a computer readable storage medium that embodies computer readable program code with instructions to control a machine to perform the above described methods and realize the above described systems.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. An exoskeleton, comprising:
   a central connection structure;
   at least one leg structure having a first end and a second end, the first end rotatably depending from the central connection structure, each at least one leg structure having a foot structure depending therefrom to contact a ground surface;
   at least one arm structure rotatably depending from the central connection structure;

at least one solar panel holder, each solar panel holder depending from a respective arm structure and adapted to releasably hold a solar panel being supported by the respective arm structure;

at least one limb actuator controllably providing forces to rotate the at least one leg structure and the at least one arm structure about the central connection structure to transfer forces from the respective arm structure supporting the solar panel to the ground surface through the at least one leg structure; and at least one auxiliary tool strut rotatably depending from one of the central connection structure, the at least one leg structure, or the at least one arm structure, the at least one auxiliary tool strut being movably positioned to operate beneath the solar panel as it is mounted onto a support.

2. The exoskeleton of claim 1, further comprising:
a conditioned air receiver configured to receive conditioned air; and
conditioned air vents, in communication with the conditioned air receiver, configured to provide the conditioned air to various locations within the exoskeleton.

3. The exoskeleton of claim 1, wherein the at least one auxiliary tool strut is configured to receive a person's arm and is configured to allow the person's arm to be moved out of the at least one auxiliary tool strut.

4. The exoskeleton of claim 3, wherein the at last one auxiliary tool strut rotatably depends from the central connection structure at a point below one of the at least one arm structure.

5. The exoskeleton of claim 1, wherein the at least one auxiliary tool strut is configured to lift heavy equipment.

6. The exoskeleton of claim 5, wherein the central connection structure and the at least one leg structure are configured to support the at least one auxiliary tool strut when the at least one auxiliary tool strut is lifting heavy equipment.

7. The exoskeleton of claim 1, wherein:
the at least one arm structure comprises a left arm structure disposed on a left side of the central connection structure and a right arm structure disposed on a right side of the central connection structure, and
the at least one leg structure comprises a left leg structure disposed on a left side of the central connection structure and a right leg structure disposed on a right side of the central connection structure.

8. The exoskeleton of claim 7, wherein the at least one solar panel holder comprises a left solar panel holder depending from the left arm structure and a right solar panel holder depending from the right arm structure.

9. The exoskeleton of claim 1, wherein each of the at least one solar panel holder comprises a vacuum attachment to attach to a surface of the solar panel.

10. The exoskeleton of claim 9, where the vacuum attachment is configured to blow air onto the solar panel prior to attachment to the solar panel.

11. The exoskeleton of claim 1, where the central connection, the at least one leg structure, the at least one arm structure, and the central connection structure are configured to have a person standing within, and
where the exoskeleton further comprises motion control inputs disposed within the exoskeleton to allow the person standing within to the exoskeleton to provide control of the at least one limb actuator to direct movement of at least one of the at least one leg structure, the at least one arm structure, and the at least one solar panel holder.

12. The exoskeleton of claim 11, wherein the at least one arm structure is configured to receive an arm of the person sand is configured to allow the person's arm to be moved out of the at least one arm structure.

13. The exoskeleton of claim 11 wherein the motion control inputs comprise pressure sensors mounted in at least one of the at least one arm structure or the at least one leg structure, the pressure sensors determining forces applied by limbs of the person and sending indications of the forces to a controller, and
where the controller directs movement of the at least one leg structure, the at least one arm structure, or the at least one solar panel holder based on the indication of the forces.

14. The exoskeleton of claim 1, further comprising a controller configured to, when operating, provide control of the at least one limb actuator, and the at least one solar panel holder, the controller further operating to cause the at least one limb actuator to transfer forces supporting a solar panel being held by the at least one solar panel holder to the ground surface through at least the at least one arm structure and the at least one leg structure.

15. The exoskeleton of claim 14, where the controller is further configured to execute a program to control the at least one limb actuator and the at least one auxiliary tool strut to automatically perform operations to install the solar panel onto a mounting frame.

16. The exoskeleton of claim 14, further comprising a LIDAR sensor, communicatively coupled to the controller, the LIDAR sensor having a view of the solar panel holder, where the controller.

* * * * *